(12) United States Patent
Radcliffe

(10) Patent No.: US 9,690,850 B2
(45) Date of Patent: Jun. 27, 2017

(54) RECIPE IDENTIFICATION METHOD AND APPARATUS

(71) Applicant: Under Armour, Inc., Baltimore, MD (US)

(72) Inventor: Paul Radcliffe, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 104 days.

(21) Appl. No.: 14/826,235

(22) Filed: Aug. 14, 2015

(65) Prior Publication Data

US 2016/0188712 A1 Jun. 30, 2016

Related U.S. Application Data

(60) Provisional application No. 62/037,522, filed on Aug. 14, 2014.

(51) Int. Cl.
*G06F 17/30* (2006.01)
*G06F 17/27* (2006.01)

(52) U.S. Cl.
CPC ...... *G06F 17/30707* (2013.01); *G06F 17/277* (2013.01)

(58) Field of Classification Search
CPC .............. A61K 2300/00; A61K 31/198; A23V 2002/00; A23V 2250/264; A23V 2250/5036
USPC ..... 704/245, 7; 707/770, 771, 722, 999.003, 707/E17.014; 715/776; 705/14.53, 26.8; 708/133
See application file for complete search history.

(56) References Cited

U.S. PATENT DOCUMENTS

2009/0037288 A1* 2/2009 Christensen ....... G06Q 30/0633
705/26.8
2015/0339394 A1* 11/2015 Jinq ...................... G09B 19/00
715/776

* cited by examiner

*Primary Examiner* — Charlotte M Baker

(57) ABSTRACT

Disclosed embodiments include apparatus, method and storage medium associated with recipe identification. In embodiments, an apparatus may include a recipe identification function configured to receive or retrieve a text document, analyze the text document to identify a recipe, and return the identified recipe. Other embodiments may be described and claimed.

20 Claims, 4 Drawing Sheets

RECIPE IDENTIFICATION METHOD AND APPARATUS

RELATED APPLICATIONS

This application claims priority from U.S. Provisional Patent Application No. 62/037,522 filed on Aug. 14, 2014, the entirety of which is incorporated by reference herein.

TECHNICAL FIELD

The present disclosure relates to the field of data processing. More particularly, the present disclosure relates to recipe identification method and apparatus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Currently if an individual would like to save a recipe the individual encountered in an article, online or printed, the individual has to identify the various components of the recipe himself/herself, i.e., the name of the recipe, ingredients, servings, directions and so forth. The undertaking could be cumbersome in many cases.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
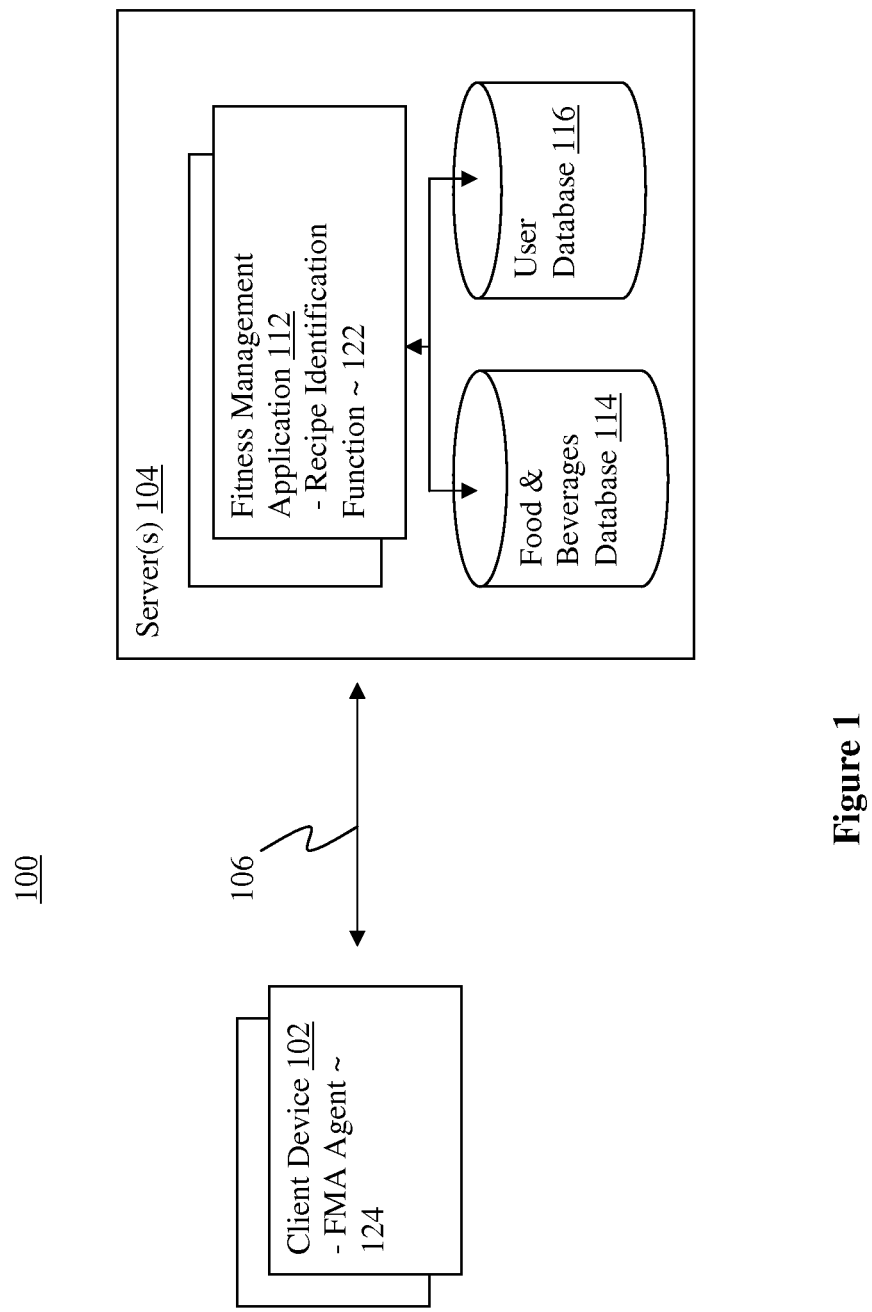
FIG. 1 illustrates a fitness management system suitable for practicing the present disclosure, according to the various embodiments.

Disclosed embodiments include apparatus, method and storage medium associated with fitness management application in general, and recipe identification in particular.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Referring now to FIG. 1, wherein a fitness management system, according to the various embodiments, is illustrated. As shown, fitness management system (FMS) 100 may include client devices 102 and one or more servers 104 coupled with each other. Server(s) 104 may host a fitness management application (FMA) 112, including a number of databases, e.g., food and beverages database 114 and user database 116, configured in accordance to the teachings of the present disclosure. Whereas each client device 102 may include a client side agent 124 of FMA 112 configured to access and interact with FMA 112, to enable a user of the client device 102, among other things, to develop a fitness plan that may include a food and beverage budget, and monitor the progress towards meeting the plan, to be described more fully below.

In embodiments, servers 104, except for FMA 112 and databases 114-116, may be any one of a number of computer servers known in the art, including but are not limited to servers available from Dell Computing of Austin, Tex. or Hewlett Packard of Palo Alto, Calif. In embodiments, FMA 112 may include recipe identification function 122 configured to extract a recipe from a textual document or an image of a textual document, for client device 102 or other components of FMA 112.

In embodiments, food & beverages database 114 may include tables having keywords frequently found in various sections of a recipe, e.g., ingredient keywords, such as chicken, beef, pork, lamb, shrimp, scallop, squid, salmon, halibut, rock cod, potato, onion, tomato, carrots, salt, pepper, sugar, soya sauce, and so forth, serving keywords, such as, a cup, ½ cup, ¼ cup, 1 table spoon, ½ table spoon, ¼ table spoon, 4 fluid oz, 8 fluid oz, 12 fluid oz, 1 gram, 2 grams, 4 grams, and so forth, or direction keywords, such as debone, rub, stir, bring to boil, simmer, and so forth. It should be noted that the preceding examples are illustrative only, and not limiting. In embodiments, food & beverages database 114 may include tables having hundreds and thousands of ingredient, serving, and/or direction keywords frequently found in various sections of a recipe. In embodiments, information about ingredient items may also include nutrient information for various units of measures. Examples of nutrient information may include, but is not limited to, amount of sodium, carbohydrates, calcium, various vitamins and calories per serving size of various units of measures.

In embodiments, client devices 102 may be any one of a number of stationary or portable electronic devices known in the art, including but are not limited to, desktop computers available from Dell Computing of Austin, Tex., or smartphones, computing tablets, lapstop computers, electronic readers, personal digital assistants, and so forth, such as Galaxy S4 from Samsung Electronics of Seoul, Korea, or iPad from Apple Computer of Cupertino, Calif. In embodiments, one or more portable computing devices 102 may be a wearable computing device, e.g., a smart watch, a smart eyeglasses, and so forth. In embodiments, FMA agent 122 may be a generic browser, such as Internet Explorer, available from Microsoft Corp., of Redmond, Wash., or Safari from Apple Computer of Cupertino, Calif., e.g., in cases where client devices 102 are desktop or tablet computers. In other embodiments, FMA agent 122 may be a client side application, e.g., in cases where client devices 102 are personal digital assistants or smartphones.

In embodiments, client devices 102 and server(s) 104 may be communicatively coupled with one another via communication links 106 over one or more wired and/or wireless, private and/or public networks, including the Internet. Each of client devices 102 and server(s) 104 may be configured with the appropriate networking communication interfaces. An example of wired communication interface may include but is not limited Ethernet, while examples of wireless communication interfaces may include but are not limited to near field communication (NFC), Bluetooth, WiFi, 4G or 5G LTE. In between the communication interfaces of client devices 102 and server(s) 104 may be any number of gateways, routers, switches, based stations, and so forth.

Figure 2:
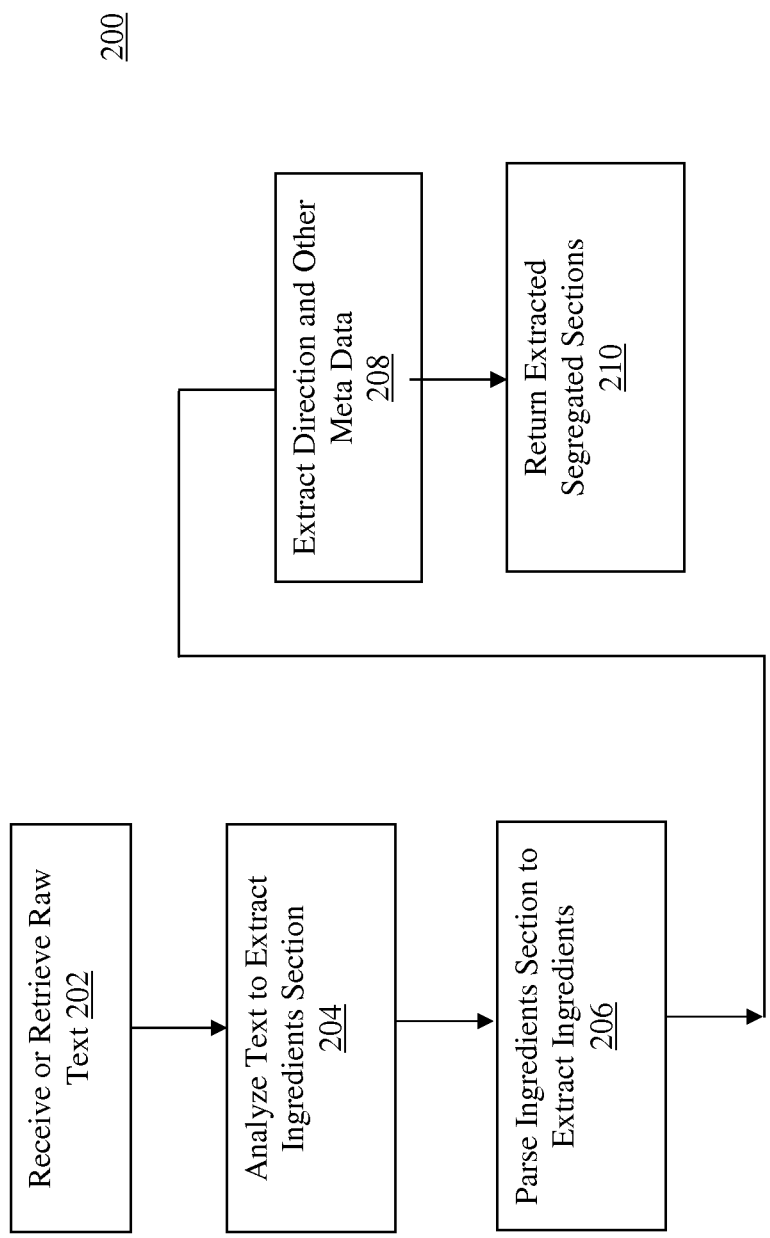
FIG. 2 illustrates an example operation flow of the recipe identification function of FIG. 1 in further details, according to the various embodiments.

Referring now FIG. 2, wherein a method for recipe identification, in accordance with various embodiments, is shown. As illustrated, method 200 for recipe identification may include operations performed in blocks 202-210. The operations may be performed, e.g., by earlier described recipe identification function 122 of FMA 112 of FIG. 1.

At block 202, raw text to be analyzed to identify and extract a recipe may be received or extracted. In embodiments, an article or an image (or a locator of the article or image) containing the raw text may be received from client device 102 or another component of FMA 112. An example of a locator may be a uniform resource locator (URL). In the case of receipt of a locator, the article or image may be retrieved using the locator. Further, in the case of an image, character recognition may performed to extract the raw text to be analyzed from the image. On receipt or retrieval of the raw text, from block 202, process 200 may proceed to block 204.

At block 204, the raw text may be analyzed, and ingredient sections, i.e., sections of the raw text having ingredient information, may be identified. In embodiments, the analysis and identification may first begin with language identification, by looking up known common words and characters of various languages. The search for known common words and characters of various languages may begin with likely languages, e.g., based on locations of client devices 102, or which websites the article/image was retrieved. Once the language of the raw text is identified, the analysis may continue to identify the ingredient sections, through frequency analysis of known units of measures, e.g., cups, tablespoons, fluid oz, grams, and so forth, including common typos and alternative spellings. On identification of the ingredient sections, from block 204, process 200 may proceed to block 206.

At block 206, the individual text lines of the various ingredient sections may be parsed to discover the ingredients. Parsing may be performed using any one of a number of parsing techniques known. Ingredients may be identified through known ingredient keywords maintained in food and beverage database 114. Once the ingredient has been identified, from block 206, process 200 may proceed to block 208.

At block 208, the raw text may be analyzed to identify direction information and related meta data. Identification of direction information and related data may be located in part using the ingredients identified at block 206 as guide, and the known direction keywords maintained in food and beverage database 114. On identification of the direction and related metadata, from block 208, process 200 may proceed to block 210.

Metadata can be found using known keyword matching, known patterns and previously extracted information. Keyword matching is useful for determining metadata such as course ('Main Course', 'Appetizer', 'Desserts'). Pattern matching is used to determine metadata where a common text appears with relevant information interpolated. For example, to determine prepartion time for a recipe, the text: "Prep Time: 10 minutes" is found, and the relevant metadata is '10 minutes'. Further, previously extracted information can be used to refine metadata. For example if the processing has discovered the name of a recipe to be "Chocolate Chip Cookies," the keyword cookies may be used to determine serving size metadata, i.e. "Makes 10 Cookies".

At block 210, the gathered information may be organized into a standardized or normalized recipe format, and return to client device 102 or another component of FMA 112, which requested the analysis and identification. On return, process 200 may end.

For example given the raw text:

---

Chocolate Chip Cookies

---

Prep Time: 10 minutes
Cook Time: 25 minutes
Makes 10 cookies
1 stick unsalted butter
½ cup packed dark brown sugar
¾ cup sugar
2 large eggs
Preheat Oven. Mix butter and Sugar. Mix remaining ingredients.
Bake for 25 minutes.

---

The recipe identification system may yield:

| | |
|---|---|
| Recipe Name | Chocolate Chip Cookies |
| Prep Time | 10 minutes |
| Cook Time | 25 minutes |
| Total Time | 35 minutes |
| Ingredients | 1 stick unsalted butter |
| | ½ cup packed dark brown sugar |
| | ¾ cup sugar |
| | 2 large eggs |
| Directions | Preheat Oven. Mix butter and Sugar. Mix remaining ingredients. Bake for 25 minutes. |

Figure 3:
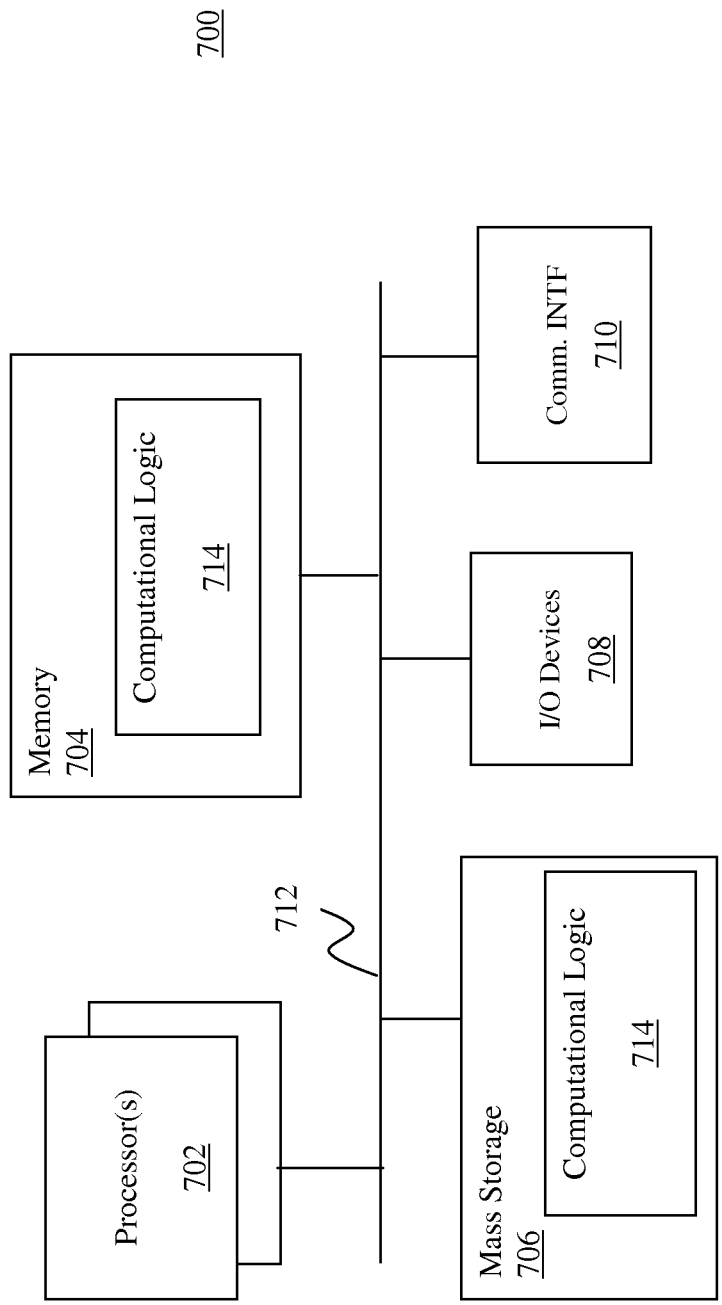
FIG. 3 illustrates an example computing system suitable for use as a fitness management server or a client device, according to various embodiments.

Referring now to FIG. 3, wherein an example computer suitable for use as computing device 114 or portable client device 104 of FIG. 1, in accordance with various embodiments, is illustrated. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include mass storage devices 706 (such as diskette, hard drive, compact disc read only memory (CD-ROM) and so forth), input/output devices 708 (such as display, keyboard, cursor control and so forth) and communication interfaces 710 (such as network interface cards, modems and so forth). The elements may be coupled to each other via system bus 712, which may represent one or more buses. In the case of multiple buses, they may be bridged by one or more bus bridges (not shown).

Each of these elements may perform its conventional functions known in the art. In particular, when used as computing device 114, system memory 704 and mass storage devices 706 may be employed to store a working copy and a permanent copy of the programming instructions implementing the operations associated with recipe identification function 122 earlier described, shown as computational logic 714. The various elements may be implemented by assembler instructions supported by processor(s) 702 or high-level languages, such as, for example, C, that can be compiled into such instructions.

The permanent copy of the programming instructions may be placed into permanent storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 710-712 may vary, depending on whether computer 700 is used as computing device 114 or portable client device 104. When used as portable client device 104, computing device 700 may be a smartphone, computing tablet, ereader, ultrabook or laptop. Otherwise, the constitutions of elements 710-712 are known, and accordingly will not be further described.

Figure 4:
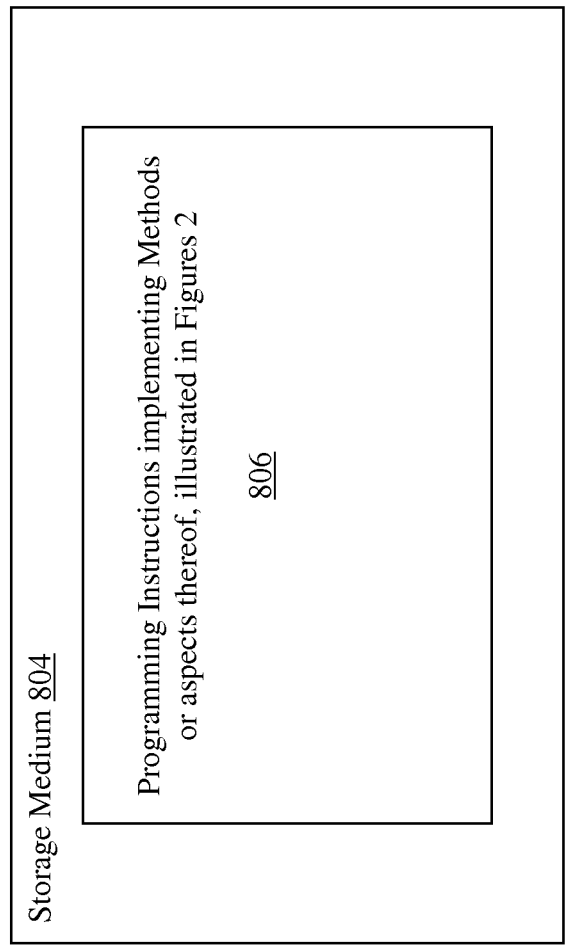
FIG. 4 illustrates an example storage medium having instructions to cause a computing device to practice aspects of the fitness management application, recipe identification function in particular, according to various embodiments.

FIG. 4 illustrates an example computer-readable non-transitory storage medium having instructions configured to practice all or selected ones of the operations associated with earlier described recipe identification function 122, in accordance with various embodiments. As illustrated, non-transitory computer-readable storage medium 804 may include a number of programming instructions 806. Programming instructions 806 may be configured to enable a device, e.g., computer 800, in response to execution of the programming instructions, to perform, e.g., various operations of process 200 of FIG. 2, e.g., but not limited to, the operations associated with recipe identification function 122. In alternate embodiments, programming instructions 804 may be disposed on multiple computer-readable non-transitory storage media 804 instead. In alternate embodiments, programming instructions 804 may be disposed on computer-readable transitory storage media 804, such as, signals.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method comprising:
at a server device, receiving first formatted recipe data from a client device in communication with the server device, the first formatted recipe data comprising at least a plurality of words relating to a recipe;
analyzing individual ones of the words relating to the recipe data to determine whether each may be found within one of three databases of known words, the three databases comprising: a database of known ingredient-related words, a database of known measurement-related words, and a database of known direction-related words;
extracting nutrition information associated with at least the individual ones of the words relating to the recipe data as being found within the database of known ingredient-related words;
organizing the extracted nutrition information and the characterized individual ones of the words relating to the recipe data into a second formatted recipe data; and
providing the second formatted recipe data from the server device to the client device for nutrition logging performed thereat.

2. The method of claim 1, wherein the database of known ingredient-related words comprises a list of all words known to be related to ingredients or nutrient information of food and beverages, wherein the database of known measurement-related words comprises a list of all words known to be related to measurements of food and beverages and/or serving sizes for food and beverages, and wherein the database of known direction-related words comprises a list of all words known to be related to preparation techniques for food and beverages.

3. The method of claim 1, wherein the act of organizing comprises organizing the second formatted recipe data such that the individual ones of the words found in the ingredient database are organized into an ingredient section, the individual ones of the words found in the measurement database are organized into a serving section and text information related to the direction keyword category is organized into a direction section.

4. The method of claim 1, wherein the first formatted recipe data is received from a camera apparatus of the client device as an image taken thereby and the act of analyzing further comprising utilizing optical character recognition (OCR) to identified the individual ones of the words of the image.

5. The method of claim 1, wherein the act of extracting nutrition information further comprises determining one or more nutritional values of the recipe data based at least in part on one or more component ingredients as determined by the act of analyzing.

6. The method of claim 1, wherein the nutrition logging performed at the client device comprises an identification by a user of the device that at least a portion of a food or beverage prepared according to the second formatted recipe data was consumed.

7. A computer-readable, non-transitory storage medium having computer executable instructions stored thereon, which when the instructions are executed are operable to:
retrieve a plurality of text relating to a recipe from a client device in communication with a server device;

analyze individual words comprising the plurality of text relating to the recipe to determine whether each may be found within one of three keyword databases of known words, the three keyword databases comprising: a database of known ingredient-related words, a database of known measurement-related words, and a database of known instruction-related words;

extract nutrition information associated with individual ones of the words identified in the known ingredient-related keyword database;

organize the extracted nutrition information and the analyzed individual ones of the words into a second recipe comprising at least three sections related to the keyword database to which each word of the plurality of text of the recipe is associated; and enable a user of the client device to log the second recipe data via a nutrition logging program executed thereat.

8. The computer readable storage media of claim 7, wherein the ingredient keyword database comprises text information related to ingredients or nutrient information of food and beverages, wherein the measurement keyword database comprises text information related to measurements and/or serving sizes for food and beverages, and wherein the instruction keyword database comprises text information related to preparation techniques for food and beverages.

9. The computer readable storage media of claim 7, wherein the instructions that are operable to organize comprise instructions that are operable to organize the extracted nutrition information such that the individual words identified within the ingredient keyword database are organized into an ingredient section, the individual words identified within the measurement keyword database are organized into a measurement section and the individual words identified within the instruction keyword database are is organized into an instruction section.

10. The computer readable storage media of claim 7, wherein the plurality of text relating to the recipe comprises text determined from an image captured by a camera apparatus of the client device, the determination comprising utilization of an optical character recognition (OCR) program run at the client device or the server.

11. The computer readable storage media of claim 7, wherein the plurality of text relating to the recipe comprises text retrieved from a uniform resource locator (URL) provided by the client device to the server device.

12. The computer readable storage media of claim 7, wherein the instructions are further operable to:

determine a language of the plurality of text based at least in part on a geographic location of the client device; and analyze the individual words comprising the plurality of text relating to the recipe to determine whether each may be found within one of three keyword databases of known words for the determined language.

13. The computer readable storage media of claim 7, wherein the analysis of the individual words comprising the plurality of text relating to the recipe comprises for each of the individual words, sequentially examining the database of known ingredient-related words, the database of known measurement-related words, and the database of known instruction-related words until a match is found; when no match is found for a particular one of the individual words, omitting analysis of the particular one of the individual words.

14. An apparatus comprising:
a memory unit; and
a processor coupled to the memory unit and configured to execute a plurality of instructions which are configured to when executed cause the apparatus to:

retrieve recipe text information from a client device in communication with the apparatus, the recipe text information comprising at least a plurality of words relating to preparation of a food or beverage;

analyze the text information to determine one of a plurality of keyword categories for individual ones of the plurality of words in the text information, the keyword categories being determined based on a presence of the individual ones of the plurality of words within a database of known words for each of three available keyword categories;

extract nutrition information associated with at least the individual ones of the words identified within the keyword category relating to known ingredients;

organize the extracted nutrition information and the plurality of words into sections related to the keyword categories; and provide the organized extracted nutrition information and the plurality of words to the client device for nutrition logging thereat.

15. The apparatus of claim 14, wherein the keyword categories comprise one or more of: an ingredient keyword category, a serving keyword category, and a direction keyword category.

16. The apparatus of claim 14, wherein the plurality of instructions are further configured when executed cause the apparatus to organize the plurality of words such that individual ones of the plurality of words which are related to the ingredient keyword category are organized into an ingredient section, individual ones of the plurality of words which are related to the serving keyword category are organized into a serving section and individual ones of the plurality of words which are related to the direction keyword category are organized into a direction section.

17. The apparatus of claim 14, wherein the recipe text information retrieved from the client device comprises text data obtained from an image taken by a camera at the client device or retrieved from a uniform resource locator (URL) provided by the client device.

18. The apparatus of claim 14, wherein the act of extracting nutrition information further comprises determining one or more nutritional values of the recipe text information based at least in part on one or more component ingredients as determined by the act of analyzing.

19. The apparatus of claim 14, wherein the nutrition logging performed at the client device comprises an identification by a user of the device that at least a portion of a food or beverage prepared according to the recipe text information was consumed.

20. The apparatus of claim 14, wherein the plurality of instructions are further configured when executed cause the apparatus to determine a language of the plurality of text based at least in part on a geographic location of the client device; and analyze the individual words comprising the plurality of text relating to the recipe to determine whether each may be found within one of three keyword databases of known words for the determined language.

* * * * *